Oct. 12, 1948.	G. T. HART	2,450,956
ELECTRODE RETAINING CLAMPS FOR MARGINAL BONDING
WITH HIGH-FREQUENCY ELECTRIC FIELD
Filed Aug. 17, 1946
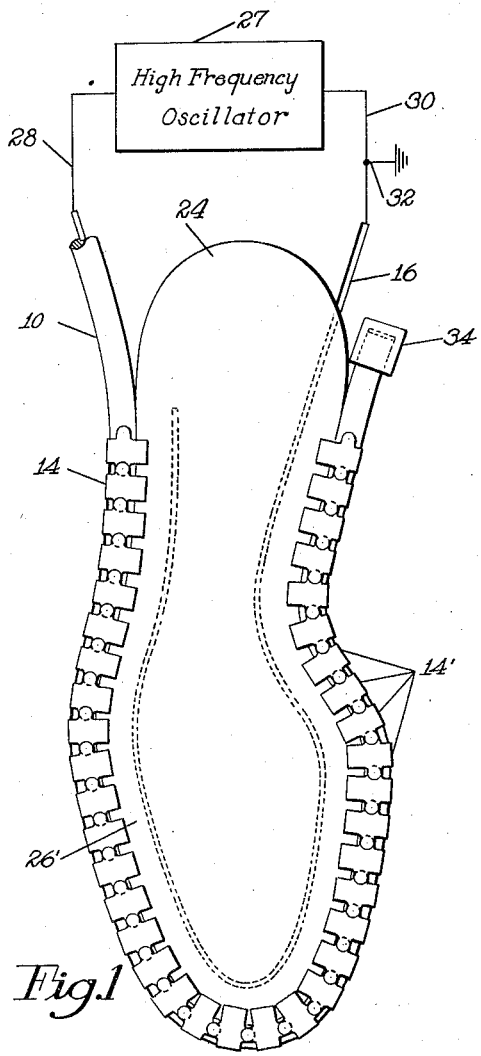
Fig. 1
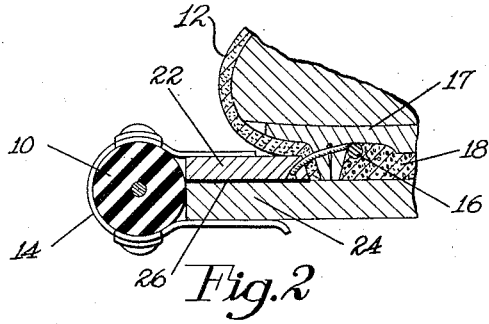
Fig. 2
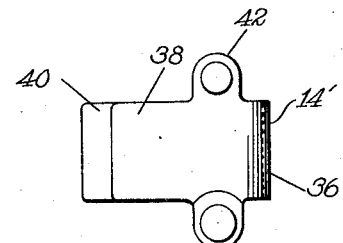
Fig. 3ª
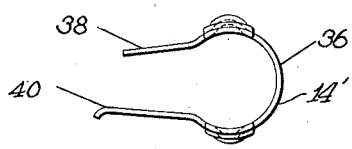
Fig. 3ᶜ
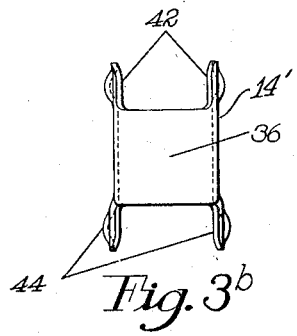
Fig. 3ᵇ
Inventor
George T Hart
By his Attorney Patented Oct. 12, 1948

2,450,956

UNITED STATES PATENT OFFICE 2,450,956

ELECTRODE RETAINING CLAMPS FOR MARGINAL BONDING WITH HIGH-FREQUENCY ELECTRIC FIELD

George T. Hart, Lynn, Mass., assignor to United Shoe Machinery Corporation, Flemington, N. J., a corporation of New Jersey Application August 17, 1946, Serial No. 691,222

6 Claims. (Cl. 219—47)

This invention relates to apparatus utilizing the effects of high-frequency fields for the activation of thermoactive adhesives applied along the contacting margins of superposed pieces. The invention has been illustrated herein as applied to apparatus for sole attaching with a flange type shoe such as a welt or stitchdown shoe although it is not limited in this respect.

In the application of high-frequency dielectric heating principles to apparatus for sole attaching, a well-known problem relates to the provision of electrodes capable when supplied with a high-frequency voltage of establishing a localized field uniformly in the interfacial band of cement between the sole and welt extending around the margin of the shoe, and, coincidentally with the activation of the cement, to apply compacting pressure between the parts without interfering with the effect of the field. In my copending application Serial No. 536,857, filed on May 23, 1944, (now Patent No. 2,426,267, dated August 26, 1947), there is disclosed a system of this character in which the outer electrode outside said band of cement is embodied in a welt holddown and an inner cooperating electrode is retained either against the inner face of the inseam or within an inflatable pad against which bears the sole. This apparatus is particularly useful for factory purposes wherein cost and complexity are of less importance relatively than in the case of the small shoe repair shop, for example, where the investment must be small and the apparatus simple yet useful for a wide variety of shoe sizes and styles.

With this in view, the general object of the present invention is to provide an improved apparatus, for joining work pieces marginally with high-frequency dielectric heating, which is simple and economical to use and which is adaptable to various shapes and sizes of work such, for example, as shoes of the welt or stitchdown type having a projecting flange at the bottom of the shoe.

A principal feature of the invention resides in an electrode-retaining clamp for the application of compacting pressure to the marginal portions of the work, and which, for flexibility, comprises a series of interconnected clamp members.

Another feature resides in the provision of a device of this character with which the work parts to be joined may be held together marginally under pressure with a continuous opening between the electrode and the edge of the work for the unhindered penetration of the electric field into the work. Novel clamp construction in such a device is present in the provision of indented body extensions on each clamp member for the interconnection of a series of such members into a flexible clamp adapted to conform to the various shape requirements of the work. The body portions and jaws of the clamp members in one embodiment have been formed of resilient sheet metal.

The above and other features of the invention including various novel details of construction will now be described more fully with reference to the accompanying drawings in which Fig. 1 is a bottom view of a flanged shoe with an electrode retaining clamp in operative position thereon;

Fig. 2 is a fragment of a transverse vertical section taken through the mid forepart of the shoe of Fig. 1; and Figs. 3a, 3b and 3c are top, side and end views respectively of one clamp member of the series forming a clamp embodying the invention.

In Figs. 1 and 2 a flexible insulated wire 10 forming an outer electrode is retained in position along the common outer edge of a welt 22 and sole 24 around the forepart of a welt shoe 12 by means of a flexible C-clamp 14 elongated beside the outer electrode and which comprises a series of clamp members 14' individually engaging successive marginal portions of the shoe parts. The arrangement is such that the electrode 10 is positioned substantially in the plane of the interface between the parts to be joined.

Cooperating with the electrode 10 is an inner electrode wire 16 which may conveniently be laid against the bottom of the insole 17 between the filler 18 and the inner face of the inseam 20.

It will be apparent that the maximum voltage gradient of a direct field set up between the electrodes 10 and 16 will pass substantially through the interface between the marginal portions of the welt 22 and sole 24 respectively, and will lie in the plane of an interfacial layer of cement 26 in the marginal zone 26'. For establishing such a field high-frequency energy is supplied to the electrodes 10 and 16 by means of an oscillator 27 through the respective leads 28 and 30. The lead 30 and hence the electrode 16 is grounded at point 32 principally for purposes of convenience and of safety to the operator since the electrode 16 will usually not be insulated. An insulating cap 34 may be placed over the free end of the outer insulated wire electrode 10 to prevent possible arcing to or contact with grounded objects by the bare end of the wire.

In using the apparatus, the inner electrode 16 may be shaped from a length of copper wire to conform to the shape of the outline of the inseam and may be held in place by the application of the usual filler 18 to the shoe bottom. One end of the wire 16, as shown, may conveniently be allowed to extend free of the shoe for connection to the high-frequency oscillator. The next step is the positioning of the clamp 14 attended by the disposal of the electrode 10 along the edge of the shoe parts. The clamp 14 may be applied by a wrapping action commencing either at one end thereof or at the middle portion engaging the toe portion of the shoe parts. With the application of the field the band of cement 26 becomes activated and a bond is completed between the parts under the pressure of the clamp 14. The clamp may then be removed and the free end of the inner electrode wire 16 trimmed off. Leaving the wire 16 in the completed shoe will have no detrimental effect on the product since the wire may be relatively small and of negligible stiffness and weight. In this respect, a braided wire may be preferable for the electrode 16, as it may be also for the electrode 10.

The clamp 14 in the embodiment shown consists in a series of pivotally interconnected resilient two-sided clamp members or clips 14' illustrated in detail in Figs. 3a, 3b and 3c. Each clamp member comprises a bowed body portion 36 having a semi-cylindrical groove or recess and joining jaws 38 and 40 which extend inwardly of the zone 26' and preferably may be slightly convergent away from the body portion 36 such that upon extension for application to the work they will be in substantially parallel relation and thus in full surface-to-surface engagement with opposite faces of the work. To facilitate the application of the clamp to the work parts the upper jaw 38 may be slightly shorter than the lower jaw 40 and the latter may have a terminal out-curved lip, the whole being constructed of some resilient material such as spring steel. To provide for pivotally connecting the clamp members 14' together in the assembly of the clamp proper, each member is provided with two pairs of indented portions which may be extensions 42 and 44 adapted for mutual interlocking with the extensions of the clamp member next adjacent. For this purpose the distance between the extensions of one pair is made slightly less than that of the other pair. Each extension has a central indentation forming a hollow on one surface and a hump on its opposing surface. Pivotal interlock between the clamp members is effected when the corresponding pairs of indented portions of adjacent clamp members have been snapped together, the closely spaced pair of one member being snapped into position inside the more widely spaced pair of the adjacent member. The pivotal axes of the indentations on opposite sides are parallel and are alined in a vertical plane passed through the body portion 36 and substantially perpendicular to the transverse mid plane between the jaws 38 and 40. It will be apparent that the amount by which the extensions project from the body portion 36 will be dependent upon the amount of flexure desired in the clamp since there must be sufficient clearance between the corners of adjacent jaw members 38 or 40 on successive members 14' to allow such flexure. This will ordinarily be determined by the radius of curvature of the toe of the smallest shoe to which the apparatus is to be applied.

It will be understood that one advantage of designing the clamp members in this way and in constructing the clamp in the manner shown is to permit the application of compacting pressure to the shoe parts without interfering with the establishment of the field in the cement layer. To this end there is a continuous opening provided along the length of the clamp with no metal projections extending between the electrode wire and the edge of the work. Moreover, the outer electrode may always be conformed to the exact shape of the edge of the sole and welt and the distance between the electrodes will thereby be substantially constant, thus permitting uniform heating throughout the cement band 26 which usually extends only around the forepart of the shoe and back to the heel breast line.

It will be apparent from the foregoing that the invention will be useful for sole attaching with shoes of various shapes and sizes as well as for other applications requiring the bonding together of marginal parts of thermoactive materials or of parts coated with thermoactive adhesives.

Having thus described my invention, what I claim as new and desire to secure by Letters Patent of the United States is:

1. In a device of the class described, an elongated flexible electrode, a series of two-sided clamps, adapted to be distributed along the periphery of two parts which are to be joined by a thermoactive cement, to press these pieces together, and means on said clamps for supporting said electrode in insulated relation to the clamps and in a position adjacent to the periphery of the work whereby a high-frequency electric field may be set up between electrodes of which this is one, said field traversing a margin of the work to activate the cement.

2. In apparatus for adhesively joining work pieces and employing high-frequency dielectric heating, means for applying clamping pressure to the work parts along a marginal zone thereof and coincidentally for establishing a high-frequency electric field in said zone, said means comprising an elongated flexible C-clamp for application to both faces of the work parts in said zone, an electrode wire retained by and insulated from said clamp positioned along one edge of said zone when in operative relation therewith, and another electrode adjacent to the inner edge of said zone, whereby high-frequency voltage may be applied to said electrodes to set up said field.

3. In a device for adhesively joining two or more work pieces along a marginal zone thereof by high-frequency dielectric heating, an electrode wire adapted for disposal along the outer edge of said zone, and means for retaining said electrode wire along said edge and for clamping the pieces together marginally comprising a flexible clamp having a plurality of clamp members spaced along and partly embracing said electrode wire, said members having inwardly extending jaw portions for clamping the work parts together in said zone.

4. In a device for cement sole-attaching and the like, a flexible electrode-retaining clamp comprising a series of interconnected clamp members, said members each comprising a body portion having a groove and a pair of resilient work-gripping jaws joined to said body portion, said groove opening into the region between said jaws, pivotal connecting means for linking said members, and an insulated flexible electrode extending through the grooves of said clamp members lengthwise of said clamp, the arrangement being such that with the application of the clamp to the work said electrode is retained against the edge of the work.

5. In a device of the class described, a flexible clamp for marginal gripping engagement with superposed pieces of cemented work comprising a chain of pivotally interconnected resilient, sheet-metal clamp members, each of said members comprising a body portion forming a semi-cylindrical recess and joining resilient laterally extending jaws for engagement with opposed faces of the work and a pair of diametrically opposite indented extensions at either end of said body portion, said pairs engaging corresponding pairs of the clamp members next adjacent, and an insulated electrode wire extending through said recesses lengthwise of said clamp.

6. In a device of the class described, an elongated flexible electrode and a flexible clamp elongated beside it to retain said electrode along the periphery of two parts which are to be joined by a thermoactive cement, said clamp having an uninterrupted side opening lengthwise thereof to receive said parts and to provide an unobstructed passage through said opening to the junction of said parts for an electric field set up with the aid of said electrode.

GEORGE T. HART.

REFERENCES CITED

The following references are of record in the file of this patent:

UNITED STATES PATENTS

| Number | Name | Date |
|---|---|---|
| 2,222,615 | Hart | Nov. 26, 1940 |
| 2,275,430 | Hart et al. | Mar. 10, 1942 |
| 2,323,325 | Hart | July 6, 1943 |
| 2,324,068 | Crandell | July 13, 1943 |